May 15, 1934.  G. A. LYON  1,958,484
ORNAMENTAL MEMBER FOR WHEELS
Filed Dec. 12, 1932   3 Sheets-Sheet 1
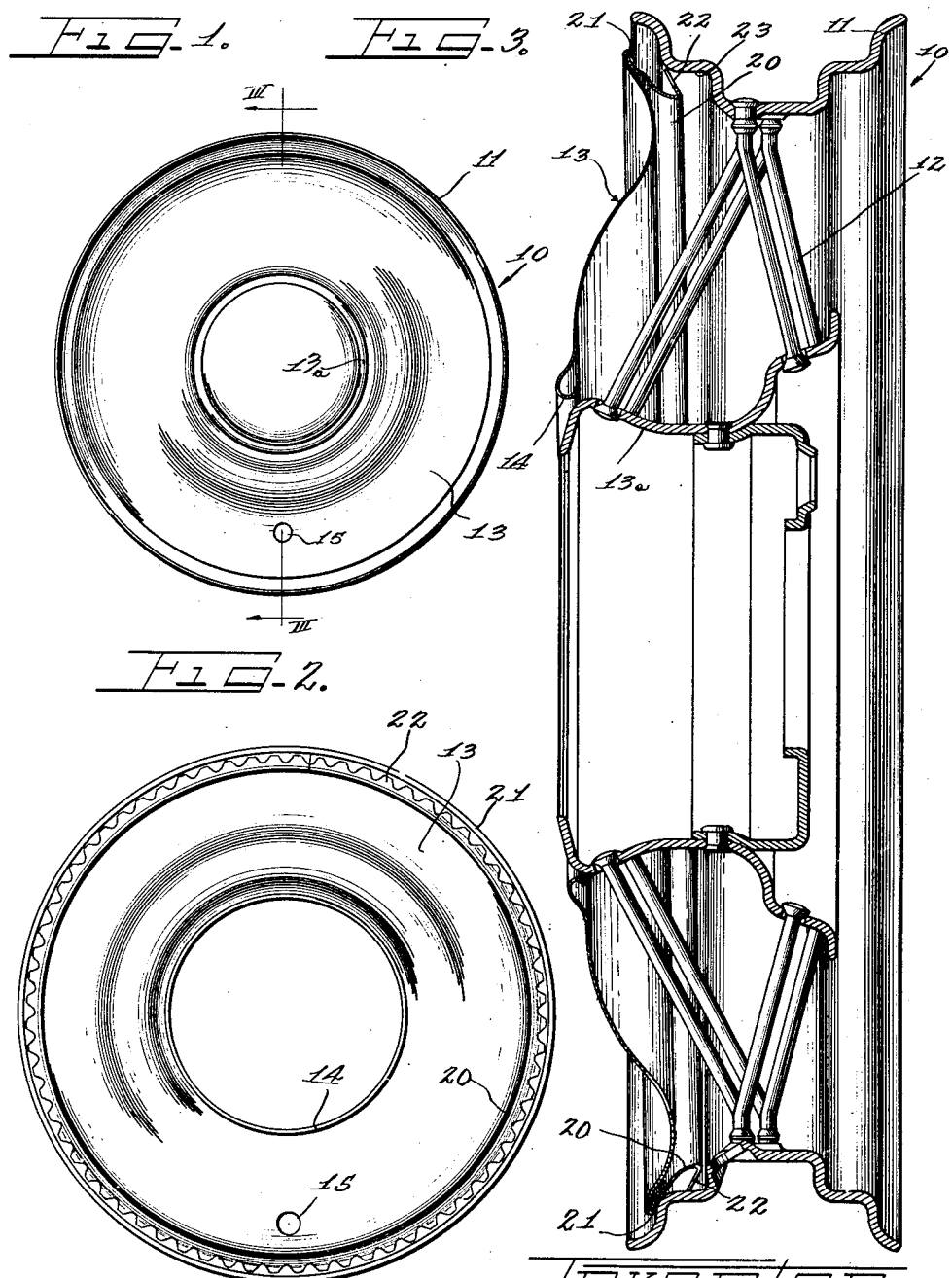
Inventor
GEORGE ALBERT LYON.

May 15, 1934.   G. A. LYON   1,958,484
ORNAMENTAL MEMBER FOR WHEELS
Filed Dec. 12, 1932   3 Sheets-Sheet 2
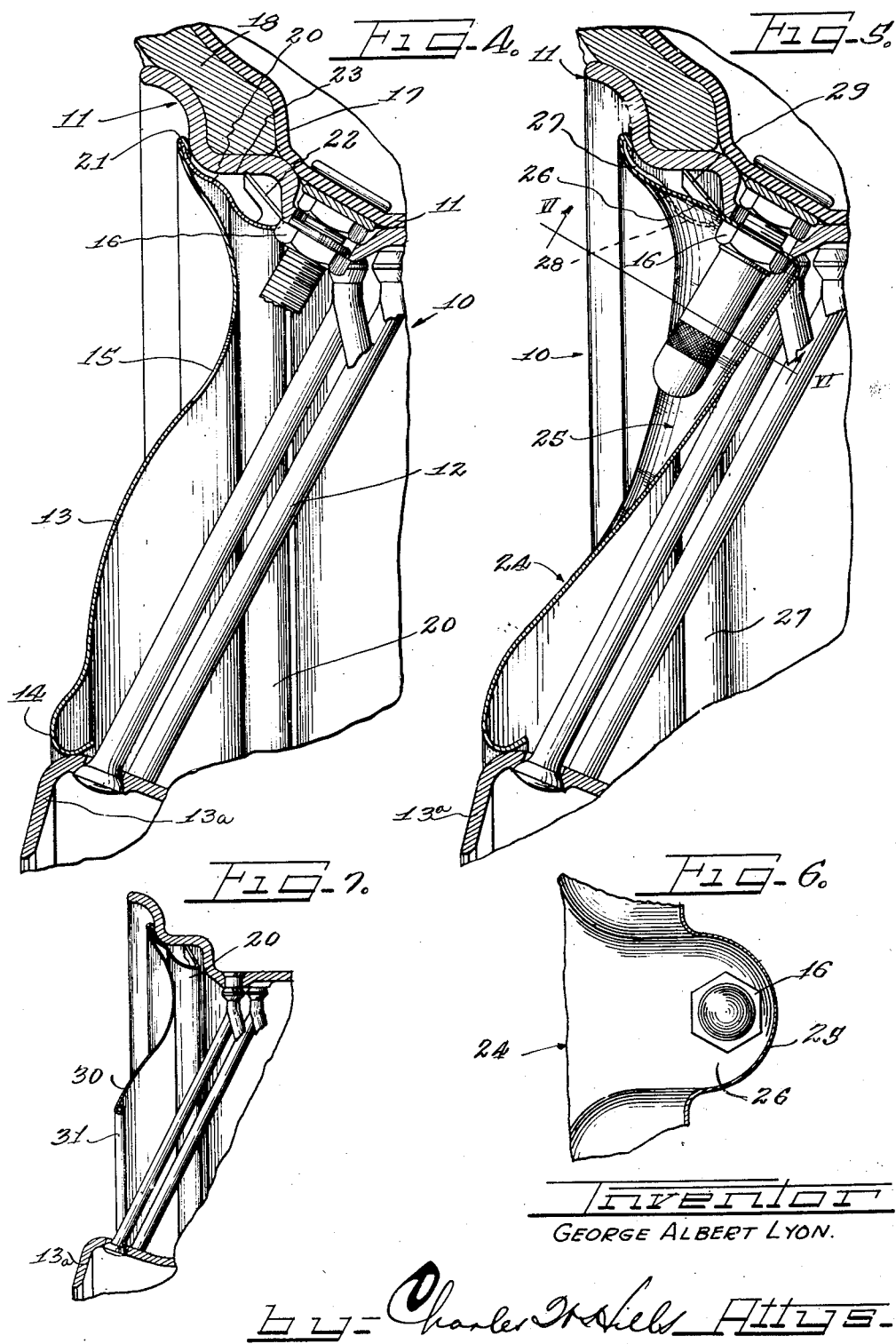
Inventor
GEORGE ALBERT LYON.
by Charles H. Fields Attys.

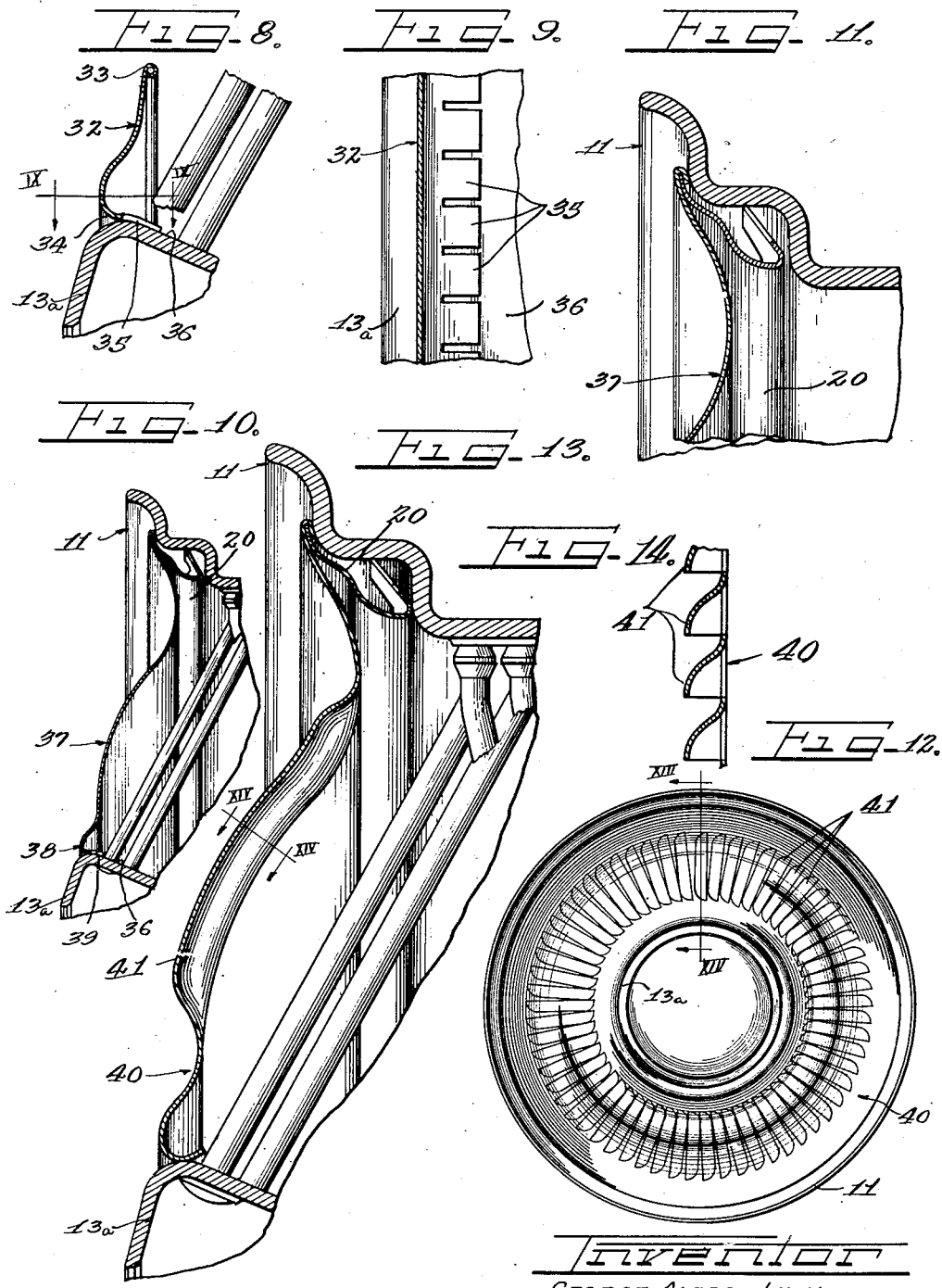

Patented May 15, 1934

1,958,484

UNITED STATES PATENT OFFICE 1,958,484

ORNAMENTAL MEMBER FOR WHEELS

George Albert Lyon, Allenhurst, N. J.

Application December 12, 1932, Serial No. 646,761

14 Claims. (Cl. 41—10)

REISSUED

This invention relates in general to a wheel ornamental device and more particularly to an ornamental member or plate adapted to be disposed between the rim and hub of an automobile wheel to cover the spokes thereof.

An object of this invention is to provide an ornamental accessory for use with automobile wheels which may be so secured in position as to not require any modification or change in the automobile wheel.

Another object of this invention is to provide an ornamental circular plate-like member for covering the spokes of an automobile wheel and so constructed that it is retained in position on the wheel solely by reason of its engagement with portions of the wheel.

Another object of this invention is to provide a circular ornamental plate for covering the spokes of a spare wheel which plate may be secured in position without requiring the use of any auxiliary or additional fastening or securing means.

A still further object of the invention resides in the provision of an ornamental wheel spoke covering plate which may be readily snapped into retained engagement with a conventional wheel without requiring the use of any special tools or equipment for disposing it in retained engagement with the wheel.

Another and further object of the invention has to do with the provision of an ornamental circular plate for disposition between the rim and hub of an automobile wheel to enhance the outward appearance of the wheel and to at the same time serve as a cover for the spokes of the wheel.

A still further object of the invention relates to the provision of means in an ornamental plate of the aforesaid characteristics for creating a transverse circulation of air through apertured portions of the plate to aid in the cooling of the brake drum associated with the wheel.

An additional and further object of the invention relates to the provision of a circular wheel spoke covering plate so formed that it will readily accommodate the conventional valve stem of the automobile tube carried by the wheel.

In accordance with the features of one form of the invention there is provided a ring-like ornamental plate having its outer periphery provided with yieldable teeth for plate retaining engagement with an inner surface of the wheel rim and having its inner periphery provided with a circular portion formed for engagement with the hub of the wheel.

In accordance with the features of another form of the invention there is provided a ring-like ornamental plate for disposition over the spokes of a wheel and having only its outer marginal portion formed for plate retaining engagement with a portion of the wheel.

In accordance with still another form of the invention there is provided an ornamental wheel spoke covering plate extending partly across the ring-like space between the wheel rim and the hub and having one of its marginal portions provided with yieldable means for engagement with a part of the wheel.

Another feature of the invention relates to the provision of means in the plate of the above entitled character for accommodating the valve stem of the inner tube carried by the wheel which means enables the plate to be secured to the valve stem in addition to the plate being secured to other parts or portions of the wheel.

Still another feature of the invention relates to the provision of ventilating openings in a plate of the above described characteristics which openings permit of the transverse circulation of air therethrough for the purpose of aiding in cooling the brake drum associated with the wheel.

Other objects and features of this invention will more fully appear from the following detail description taken in connection with the accompanying drawings which illustrate several embodiments thereof and in which Figure 1 is a side view of an ornamental plate of my invention applied to an automobile wheel.

Figure 2 is a rear view of the plate.

Figure 3 is an enlarged transverse vertical sectional view taken on the line III—III of Figure 1 looking in the direction indicated by the arrow but differing from Figure 1 in that it illustrates the plate in the process of being applied to the wheel.

Figure 4 is an enlarged sectional view of a portion similar to Figure 3 but differing from Figure 3 in that the ornamental plate is illustrated as being in retained engagement with the wheel and also in that the tire inner tube and valve stem are shown.

Figure 5 is a sectional view similar to Figure 4 but illustrating a modification of the invention in which the plate is provided with a pocket for receiving the valve stem.

Figure 6 is a fragmentary sectional view taken on the line VI—VI of Figure 5 looking upwardly and showing cross-sectional shape of the pocket and the plate.

Figure 7 is a reduced sectional view similar to Figure 4 showing a further modification of the invention in which the plate extends only part way between the wheel rim and hub and has its inner marginal portion spaced from the hub of the wheel.

Figure 8 is a fragmentary sectional view of a still further modification of the invention in which the ornamental plate has its outer marginal portion spaced from the rim of the wheel and is retained in position by means of yieldable projections on its inner margin for engagement with the wheel hub.

Figure 9 is a fragmentary sectional view taken on the line IX—IX of Figure 8 looking downwardly and showing the construction of the yieldable projection.

Figure 10 is a fragmentary sectional view similar to Figure 4 showing a modification of the invention in which both the outer and inner peripheral margins of the plate are provided with yieldable projections for engaging the wheel rim and hub of the wheel.

Figure 11 is a view comprising an enlargement of the upper part of Figure 10.

Figure 12 is a side view of a further modified form of ornamental plate showing the plate applied to a wheel and on which plate there are provided ventilating openings.

Figure 13 is an enlarged fragmentary sectional view taken on the line XIII—XIII of Figure 12 looking in the direction indicated by the arrows.

Figure 14 is a fragmentary sectional view taken on the line XIV—XIV of Figure 13 looking downwardly showing the cross-sectional shape of the ventilating openings.

In the drawings:

The reference character 10 designates generally a conventional wheel including a rim 11 connected by spokes 12 to a wheel hub 13a. The wheel rim 11 is illustrated as being of the well-known drop center type which is at present being used quite extensively in the automobile industry.

Associated with this wheel 10 is a ring-like ornamental plate designated generally by the reference character 13 embodying the features of my invention. This plate is of curved transverse cross-section and is so formed as to follow the slant of the adjacent spokes of the wheel. The inner marginal portion of this plate 13 is turned back upon itself to form a yieldable flange 14 for engaging an outer surface of the hub 13 to aid in the support of the plate on the wheel. It should be noted, however, that in this form of the invention the yieldable flange 14 does not serve to retain the plate on the wheel but, as pointed out above, merely serves to aid in supporting some of the weight of the plate.

The plate 13 is provided with an opening 15 for accommodating any suitable extension (not shown) on the valve stem 16 shown in Figure 4 as being connected to an inner tube 17 inside of a tire 18 carried by the rim 11. This feature is of course necessary so as to enable the deflation and inflation of the inner tube as desired.

The outer margin of the plate has secured to it a circular strip 20 as best shown in Figures 3 and 4. This strip of metal 20 may be made of any suitable sheet material but is preferably made of stainless steel so as to provide it with the requisite resiliency to enable it to perform its intended purpose. On the other hand the plate 13 may be made of a softer sheet material, such for example as brass, or the like. This plate is also ornamented or preferably is given a chromium or nickel plating on its outer surface so as to enhance its appearance.

The outer peripheral edge of the plate 13 is turned back upon itself as indicated at 21 so as to rigidly anchor to it the stainless steel strip 20. If it is so desired, the turned back portion 21 of the plate 13 may be welded, riveted, soldered or the like to the stainless steel strip 20.

The stainless steel strip 20 is of curved cross-sectional form and includes a plurality of obliquely extending yieldable teeth 22 for biting into the surface 23 as best shown in Figure 4. The angle of these teeth is such that any tendency to dislodge the plate from its position on the wheel only results in the augmenting of the biting engagement between the teeth and the rim surface 23.

Also the diameter of the outermost extremities of the teeth 22 is normally slightly greater than that of the rim surface 23 so that the teeth in being deflected over the surface 23 will apply pressure outwardly to enable the biting action described hereinabove.

The plate described hereinabove may be applied to the wheel without the necessity of in any way changing the construction of the wheel or without requiring the use of any special tools or equipment. The ornamental plate is placed inside of the wheel and is progressively pressed into position so as to bring the teeth 22 into biting engagement with the rim surface 23. In Figure 3 I have illustrated the plate 13 as being in the process of being applied to the wheel. On the other hand, in Figure 4 I have illustrated the plate 13 in its final position on the wheel after the teeth have all been deflected into biting engagement with the rim surface 23. It will of course be appreciated that once the plate is in position any tendency for the plate to spring out away from the rim only results in a further biting of the teeth into the rim surface 23, thereby providing a tight engagement between the plate and the wheel.

In the form of the invention appearing in Figure 5, the plate 24 corresponding to the plate 13 in the previously described form of the invention is provided with a depression 25 affording an outer wall 26 extending transversely to the stem of the valve 16. The wall 26 is provided with an opening through which the stem of the valve 16 extends, and the securing or binding strip 27 is provided with a notch or cut-out or is divided at 28 to accommodate said wall 26 as seen in Figure 5. The strip 27 is preferably of the same general form as the strip 20 and is preferably secured to the plate 24 in the same way in which the strip 20 is secured to the plate 13. Moreover, the cooperation with the teeth 28 of the strip 27 with the wheel rim surface 23 is identical with that of the teeth 22 of the strip 20 with said surface.

It will be noted that the plate 24 is connected to the valve 16 and this connection serves in conjunction with the teeth 29 of the strip 27 and with the inner margin 24a of the plate to hold the plate in proper relation to the wheel 10.

In Figure 7 the plate 30 has its inner peripheral margin 31 curled upon itself to provide a smooth edge, said edge being spaced from the hub 13a of the wheel. Except for the arrangement of its inner peripheral edge 31, the plate 30 and associated securing strip or bead 20 are essentially identical with the plate 13 and associated strip 20 of Figure 4.

Another modification of the invention is shown in Figures 8 and 9 wherein the side plate 32 is formed with its outer marginal portion 33 curled upon itself to form a smooth edge, said edge being spaced inwardly from the rim 11 of the wheel. The inner peripheral marginal portion 34 of the plate 32 is formed with a circumferential series of spring fingers 35 which yieldably engage a portion of the outer surface 36 of the hub 13a to hold the plate 32 thereon, but which are yieldable sufficiently to permit the plate 32 to be removed from and applied to the hub surface 36.

In Figures 10 and 11 is illustrated a still further modified form of the invention. In these figures, the plate 37 and associated securing ring or strip 20 are in substantially all respects identical with the plate 13 and its associated strip 20, differing therefrom only in the construction of the inner margin 38. The inner peripheral portion 38 of the plate 37 is formed in a manner corresponding to the corresponding portion 34 of the plate 32 described in connection with Figures 8 and 9. Said portion 38 is formed with a circumferential series of fingers 39 which cooperate with the outer surface 36 of the hub 13a in substantially the same manner in which the fingers 35 in Figures 8 and 9 cooperate with said surface. It will be observed that the marginal construction 38 of the plate 37, at 38 and 39, in its cooperation with the hub 13a, assists in the support of the plate 37, as the inner peripheral marginal portion 14 assists in the support of the plate 13.

The still further modified form of the invention shown in Figures 12, 13 and 14 is essentially identical with the construction appearing in Figure 4, substantially the only difference between them residing in the fact that the plate 40 of this modified structure embodies a circumferential series of louvers 41 to afford access of the air from the outside of the wheel to the brake drum and associated instrumentalities of the wheel. The arrangement of the louvers 41 is such, moreover, as to materially add to the attractiveness of the plate 40 and consequently of the vehicle in connection with which the plate 40 is employed. It will be appreciated that the shape of the louvers 41 may be varied as desired so long as the desired result is accomplished.

It will be observed from the foregoing that the invention embodies a device which materially enhances the appearance of any vehicle in connection with which the same is employed, such a device being of simple construction involving a minimum of parts and yet susceptible of being readily applied in position on a vehicle wheel by an operation which involves essentially a single movement, and, when once applied in proper position, resists any attempt to dislodge the same.

I am aware that many changes may be made and numerous details of construction may be varied through a wide range without departing from the principles of this invention, and I, therefore, do not desire limiting the patent granted hereon otherwise than is necessitated by the prior art.

I claim as my invention:

1. As an article of manufacture an automobile wheel ornamental plate structure for disposition between the rim and hub of the wheel including a ring-like plate and a laterally extending toothed portion associated with and concealed at the outer marginal part of the plate for engagement with the wheel rim to retain the plate in proper position over the spokes of the wheel.

2. As an article of manufacture an automobile wheel ornamental plate structure for disposition between the rim and hub of the wheel including a ring-like plate and a laterally extending toothed portion secured to the outer marginal part of the plate for engagement with the wheel rim to retain the plate in proper position over the spokes of the wheel, said toothed portion comprising a separate strip of material secured to the outer marginal part of said plate.

3. As an article of manufacture an automobile wheel ornamental plate structure for disposition between the rim and hub of the wheel including a ring-like plate and an integral circular member for holding the outer marginal portion of the plate in cooperation with the wheel rim, said member including a plurality of yieldable projections held in tight cooperation with said rim solely by their engagement with the rim.

4. As an article of manufacture an automobile wheel ornamental plate structure for disposition between the rim and hub of the wheel including a ring-like plate of curved transverse cross section and having a rearwardly extending toothed portion for biting into a surface of the rim to secure the plate in position on the wheel.

5. As an article of manufacture an automobile wheel ornamental plate structure for disposition between the rim and hub of the wheel including a ring-like plate of curved transverse cross section and having a rearwardly extending toothed portion for biting into a surface of the rim to secure the plate in position on the wheel, said toothed portion being of normally greater diameter than that of the surface of the wheel rim to which the portion is applied, the teeth of said portion being deflectable with respect to said rim surface and being formed to apply a pressure outwardly against said surface.

6. As an article of manufacture an automobile wheel ornamental plate structure for disposition between the rim and hub of the wheel including a ring-like plate of curved transverse cross section and having a rearwardly extending toothed portion for biting into a surface of the rim to secure the plate in position on the wheel, said toothed portion extending diagonally toward the outer margin of the plate for engagement with the rim surface so that any tendency to dislodge the plate from cooperation with the rim only augments the engagement between the toothed portion and said rim surface.

7. As an article of manufacture an automobile wheel ornamental plate structure for disposition between the rim and hub of the wheel including a ring-like plate having a laterally extending toothed portion for cooperation with a wheel rim surface at the outer periphery of the plate, said plate having its inner margin formed for yieldable cooperation with the hub of the wheel.

8. As an article of manufacture an automobile wheel ornamental plate structure for disposition between the rim and hub of the wheel including a ring-like plate having a laterally extending toothed portion for cooperation with a wheel rim surface at the outer periphery of the plate, said plate having its inner margin formed for yieldable cooperation with the hub of the wheel, said inner margin of the plate including a plurality of yieldable projections for engagement with the surface of the wheel hub.

9. The combination with an automobile wheel including a rim and a hub connected by spokes of an ornamental cover plate for disposition over said spokes and provided with laterally extending yieldable projections for biting engagement with the surface of the rim to retain the plate in position on the wheel, said plate including a depressed portion for accommodating the outermost extremity of a valve stem.

10. The combination with an automobile wheel including a rim and a hub connected by spokes of an ornamental cover plate for said spokes and a circular toothed extension for retaining said plate in cooperation with the wheel, said extension being of a normally greater diameter than that of the surface of a wheel rim to which it is to be applied, the teeth of said portion being deflectable with respect to said rim surface and being formed to apply pressure outwardly from said surface as well as being so arranged that any tendency to dislodge the plate from its position on the wheel augments the biting engagement of the teeth in said rim surface.

11. The combination with an automobile wheel including a rim and a hub connected by spokes of an ornamental cover plate for disposition over said spokes and having its outer margin provided with a lateral extension in which there is provided a plurality of diagonally extending teeth for engagement with a surface of the wheel rim to retain the plate in proper position over the spokes.

12. The combination with an automobile wheel including a rim and a hub connected by spokes of an ornamental cover plate for disposition between said rim and hub and over said spokes, said plate being formed to be yieldably snapped into engagement with said wheel whereby it is retained in position on the wheel solely by its yieldable connection therewith, said plate being provided with an opening to accommodate an inner tube valve stem whereby the latter may be connected to said plate.

13. The combination with an automobile wheel including a rim and a hub connected by spokes of an ornamental cover plate for disposition between said rim and hub and over said spokes, said plate being formed to be yieldably snapped into engagement with said wheel whereby it is retained in position on the wheel solely by its yieldable connection therewith, said plate including an outer toothed marginal portion for engagement with a rim surface and an inner toothed marginal portion for yieldable engagement with the hub of the wheel.

14. The combination with an automobile wheel including a rim and a hub connected by spokes of an ornamental cover plate for disposition between said rim and hub and over said spokes, said plate being formed to be yieldably snapped into engagement with said wheel whereby it is retained in position on the wheel solely by its yieldable connection therewith, said plate including an outer toothed marginal portion for engagement with a rim surface and an inner toothed marginal portion for yieldable engagement with the hub of the wheel, the teeth of said outer marginal portion being formed to bite into the rim surface and the teeth of said inner marginal portion being formed to yieldably engage an outer marginal surface of the wheel hub.

GEORGE ALBERT LYON.